US009786128B2

(12) United States Patent
Fulton et al.

(10) Patent No.: US 9,786,128 B2
(45) Date of Patent: Oct. 10, 2017

(54) CASINO GAME AND METHOD FOR PLAYING CASINO GAME

(71) Applicant: Castle Hill Holding LLC, Charlottesville, VA (US)

(72) Inventors: Daniel Jacob Fulton, Charlottesville, VA (US); Jason Todd Sprinkle, Pauline, SC (US)

(73) Assignee: CASTLE HILL HOLDING LLC, Charlottesville, VA (US)

( * ) Notice: Subject to any disclaimer, the term of this patent is extended or adjusted under 35 U.S.C. 154(b) by 136 days.

(21) Appl. No.: 14/716,038

(22) Filed: May 19, 2015

(65) Prior Publication Data

US 2015/0332560 A1 Nov. 19, 2015

Related U.S. Application Data

(60) Provisional application No. 62/000,320, filed on May 19, 2014.

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ...... *G07F 17/3267* (2013.01); *G07F 17/3213* (2013.01); *G07F 17/3232* (2013.01); *G07F 17/34* (2013.01)

(58) Field of Classification Search
CPC ............. G07F 17/3213; G07F 17/3232; G07F 17/3267; G07F 17/34
See application file for complete search history.

(56) References Cited

U.S. PATENT DOCUMENTS

| | | | |
|---|---|---|---|
| 4,573,681 A | 3/1986 | Okada | |
| 4,819,818 A | 4/1989 | Simkus et al. | |
| 6,676,510 B1 | 1/2004 | Bittman et al. | |
| 7,553,233 B2 | 6/2009 | Jarvis et al. | |
| 7,682,247 B2 | 3/2010 | Nelson et al. | |
| 7,946,915 B2 | 5/2011 | Cannon | |
| 8,092,294 B2 | 1/2012 | Enzminger et al. | |
| 8,597,113 B2 | 12/2013 | Anderson et al. | |
| 2003/0060277 A1* | 3/2003 | Webb ...................... | G07F 17/32 463/25 |
| 2004/0185932 A1 | 9/2004 | Lombardo | |
| 2005/0119038 A1 | 6/2005 | Stern | |
| 2006/0014583 A1 | 1/2006 | Harris et al. | |
| 2007/0077989 A1 | 4/2007 | Bozeman | |

(Continued)

OTHER PUBLICATIONS

International Search Report and Written Opinion (PCT/US2015/031579); Date of Mailing: Aug. 19, 2015.

(Continued)

*Primary Examiner* — Milap Shah
(74) *Attorney, Agent, or Firm* — Howard & Howard Attorneys PLLC

(57) ABSTRACT

A casino game, machine, system, and method for playing and awarding a payout as a function of an outcome of the game are provided. The casino game may be played using one or more computer based gaming machines. The casino game may be played over a network, online and/or using one or more mobile devices. The casino game may be played using a stand-alone gaming machine.

15 Claims, 13 Drawing Sheets

LOOKUP TABLE EXAMPLE
BASE GAME TRIGGERED
SET 0

| RNG MATCH | REEL STOPS | FOLLOW SET |
|---|---|---|
| | 0 | |
| 1 | 0,2,2,34,21 | 0 |
| 2 | 0,2,2,34,22 | 0 |
| 3 | 15,14,0,36,14 | 1 |
| 4 | 30,8,28,6,5 | 1 |
| 5 | 0,2,2,34,25 | 2 |
| 6 | 35,28,16,6,7 | 2 |
| 7 | 14,7,9,15,5 | 3 |
| 8 | 8,4,20,21,13 | 3 |
| 9 | 0,2,2,36,2 | 3 |
| 10 | 0,2,2,36,5 | 4 |

(56) References Cited

U.S. PATENT DOCUMENTS

| | | | |
|---|---|---|---|
| 2009/0124339 A1 | 5/2009 | Barton et al. |
| 2009/0258693 A1 | 10/2009 | Preston et al. |
| 2011/0117989 A1 | 5/2011 | Kennedy et al. |
| 2012/0178524 A1 | 7/2012 | Boyd et al. |
| 2012/0322538 A1 | 12/2012 | Fujisawa et al. |
| 2013/0143645 A1 | 6/2013 | Schaefer et al. |
| 2013/0217472 A1 | 8/2013 | Kitamura et al. |
| 2013/0288776 A1 | 10/2013 | Robichaud |
| 2014/0073401 A1 | 3/2014 | Colvin et al. |
| 2014/0228089 A1 | 8/2014 | Seaton et al. |

OTHER PUBLICATIONS

International Search Report and the Written Opinion of the International Searching Authority, or the Declaration mailed Aug. 19, 2015 for International Application No. PCT/US2015/031579.

* cited by examiner

LOOKUP TABLE EXAMPLE
BASE GAME TRIGGERED
SET 0

| RNG MATCH | REEL STOPS | FOLLOW SET |
|---|---|---|
| | 0 | |
| 1 | 0,2,2,34,21 | 0 |
| 2 | 0,2,2,34,22 | 0 |
| 3 | 15,14,0,36,14 | 1 |
| 4 | 30,8,28,6,5 | 1 |
| 5 | 0,2,2,34,25 | 2 |
| 6 | 35,28,16,6,7 | 2 |
| 7 | 14,7,9,15,5 | 3 |
| 8 | 8,4,20,21,13 | 3 |
| 9 | 0,2,2,36,2 | 3 |
| 10 | 0,2,2,36,5 | 4 |

FIG 4A

LOOKUP TABLE EXAMPLE
BASE GAME TRIGGERED
SET 1

| RNG MATCH | REEL STOPS | FOLLOW SET |
|---|---|---|
| | 1 | |
| 1 | 0,15,1,36,25 | 1 |
| 2 | 0,15,1,36,26 | 1 |
| 3 | 0,15,2,1,0 | 2 |
| 4 | 0,15,2,1,1 | 2 |
| 5 | 0,15,2,1,2 | 2 |
| 6 | 0,15,2,1,3 | 3 |
| 7 | 0,15,2,1,4 | 3 |
| 8 | 0,15,2,1,5 | 4 |
| 9 | 0,15,2,1,6 | 4 |
| 10 | 0,15,2,1,7 | 5 |

FIG 4B

LOOKUP TABLE EXAMPLE
BASE GAME TRIGGERED
SET 2

| RNG MATCH | REEL STOPS | FOLLOW SET |
|---|---|---|
| | 2 | |
| 1 | 3,6,16,8,0 | 2 |
| 2 | 3,6,16,8,6 | 2 |
| 3 | 3,6,18,8,6 | 3 |
| 4 | 3,6,18,8,10 | 3 |
| 5 | 4,5,7,32,5 | 3 |
| 6 | 4,5,7,32,7 | 3 |
| 7 | 4,5,7,32,25 | 4 |
| 8 | 4,5,8,10,1 | 4 |
| 9 | 4,14,16,0,24 | 5 |
| 10 | 4,14,16,0,25 | 5 |

FIG 4C

LOOKUP TABLE EXAMPLE
BASE GAME TRIGGERED
SET 3

| RNG MATCH | REEL STOPS | FOLLOW SET |
|---|---|---|
| | 3 | |
| 1 | 1,15,14,7,12 | 3 |
| 2 | 1,15,14,7,15 | 3 |
| 3 | 1,15,14,7,16 | 3 |
| 4 | 1,15,14,7,17 | 3 |
| 5 | 1,15,14,7,18 | 4 |
| 6 | 4,21,8,8,17 | 4 |
| 7 | 4,21,8,32,17 | 4 |
| 8 | 4,21,18,6,5 | 4 |
| 9 | 4,22,6,7,1 | 5 |
| 10 | 4,22,6,7,6 | 5 |

FIG 4D

LOOKUP TABLE EXAMPLE
BASE GAME TRIGGERED
SET 4

| RNG MATCH | REEL STOPS | FOLLOW SET |
|---|---|---|
| | 4 | |
| 1 | 0,21,15,8,5 | 4 |
| 2 | 0,21,15,8,9 | 4 |
| 3 | 0,21,15,8,10 | 4 |
| 4 | 0,21,15,8,14 | 4 |
| 5 | 0,21,15,8,26 | 4 |
| 6 | 0,21,25,7,3 | 4 |
| 7 | 0,21,25,7,7 | 5 |
| 8 | 0,21,25,7,8 | 5 |
| 9 | 0,21,25,7,12 | 5 |
| 10 | 0,21,25,7,24 | 5 |

FIG 4E

LOOKUP TABLE EXAMPLE
BASE GAME TRIGGERED
SET 5

| RNG MATCH | REEL STOPS | FOLLOW SET |
|---|---|---|
| | 5 | |
| 1 | 27,24,7,32,13 | 5 |
| 2 | 28,21,18,8,14 | 5 |
| 3 | 6,21,18,8,3 | 5 |
| 4 | 5,24,8,32,9 | 5 |
| 5 | 28,23,16,7,9 | 5 |
| 6 | 26,25,18,9,3 | 5 |
| 7 | 28,5,18,31,5 | 5 |
| 8 | 28,5,8,7,5 | 5 |
| 9 | 28,5,8,7,10 | 5 |
| 10 | 28,5,8,7,14 | 5 |

FIG 4F

FREE GAME TRIGGERED
SET 0

| RNG MATCH | REEL STOPS | FOLLOW SET |
|---|---|---|
| | 0 | |
| 1 | 0,2,2,34,2 | 0 |
| 2 | 0,2,2,34,22 | 0 |
| 3 | 15,14,0,36,14 | 1 |
| 4 | 30,8,28,6,5 | 1 |
| 5 | 0,2,2,34,2 | 2 |
| 6 | 35,28,16,36,7 | 2 |
| 7 | 14,7,9,15,5 | 3 |
| 8 | 8,4,20,21,13 | 3 |
| 9 | 0,2,2,36,2 | 3 |
| 10 | 0,2,2,36,5 | 4 |

FIG 5A

FREE GAME TRIGGERED
SET 1

| RNG MATCH | REEL STOPS | FOLLOW SET |
|---|---|---|
| | 1 | |
| 1 | 0,15,1,36,25 | 1 |
| 2 | 0,15,1,36,26 | 1 |
| 3 | 0,15,2,1,0 | 2 |
| 4 | 0,15,2,1,1 | 2 |
| 5 | 0,1,2,1,2 | 2 |
| 6 | 0,15,2,1,3 | 3 |
| 7 | 0,15,2,1,4 | 3 |
| 8 | 0,5,2,1,5 | 4 |
| 9 | 0,15,2,1,6 | 4 |
| 10 | 0,15,2,1,17 | 5 |

FIG 5B

FREE GAME TRIGGERED
SET 2

| RNG MATCH | REEL STOPS | FOLLOW SET |
|---|---|---|
| | 2 | |
| 1 | 3,26,16,8,2 | 2 |
| 2 | 3,6,16,8,6 | 2 |
| 3 | 3,6,16,8,6 | 3 |
| 4 | 3,6,18,8,10 | 3 |
| 5 | 4,5,7,32,5 | 3 |
| 6 | 4,5,7,32,7 | 3 |
| 7 | 4,5,7,32,2 | 4 |
| 8 | 4,5,8,10,1 | 4 |
| 9 | 4,14,16,0,24 | 5 |
| 10 | 4,14,16,0,25 | 5 |

FIG 5C

FREE GAME TRIGGERED
SET 3

| RNG MATCH | REEL STOPS | FOLLOW SET |
|---|---|---|
| | 3 | |
| 1 | 1,15,14,7,12 | 3 |
| 2 | 1,15,14,7,15 | 3 |
| 3 | 1,15,14,7,16 | 3 |
| 4 | 1,15,14,7,17 | 3 |
| 5 | 1,15,14,7,18 | 4 |
| 6 | 4,21,8,8,1 | 4 |
| 7 | 4,21,8,32,17 | 4 |
| 8 | 4,21,18,16,15 | 4 |
| 9 | 4,22,6,7,1 | 5 |
| 10 | 4,22,6,7,6 | 5 |

FIG 5D

FREE GAME TRIGGERED
SET 4

| RNG MATCH | REEL STOPS | FOLLOW SET |
|---|---|---|
| | 4 | |
| 1 | 0,21,15,8,5 | 4 |
| 2 | 0,21,15,8,9 | 4 |
| 3 | 0,21,15,8,10 | 4 |
| 4 | 0,21,15,8,14 | 4 |
| 5 | 0,2,15,8,26 | 4 |
| 6 | 0,1,25,7,3 | 4 |
| 7 | 0,21,5,7,7 | 5 |
| 8 | 0,21,2,7,8 | 5 |
| 9 | 0,21,25,7,12 | 5 |
| 10 | 0,21,25,7,24 | 5 |

FIG 5E

FREE GAME TRIGGERED
SET 5

| RNG MATCH | REEL STOPS | FOLLOW SET |
|---|---|---|
| | 5 | |
| 1 | 27,24,7,32,13 | 5 |
| 2 | 28,21,18,8,14 | 5 |
| 3 | 6,21,8,8,3 | 5 |
| 4 | 5,24,8,32,9 | 5 |
| 5 | 28,23,16,7,9 | 5 |
| 6 | 26,25,8,9,3 | 5 |
| 7 | 28,5,18,31,5 | 5 |
| 8 | 8,5,8,7,5 | 5 |
| 9 | 28,5,8,7,10 | 5 |
| 10 | 28,5,8,7,14 | 5 |

FIG 5F

CASINO GAME AND METHOD FOR PLAYING CASINO GAME

CROSS-REFERENCE TO RELATED APPLICATIONS

The present application claims priority to U.S. Provisional Patent Application Ser. No. 62/000,320, filed May 19, 2014, the entire disclosure of which is hereby incorporated by reference.

COPYRIGHT NOTICE

The figures included herein may contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

BACKGROUND OF THE INVENTION

1. Field of the Invention

The present invention relates generally to gaming consoles, video devices, gaming machines, or networked gaming machines and, more particularly to gaming machines found in casinos or betting environments.

2. Description of the Related Art

Gaming machines, otherwise known as slot machines, poker machines, video lottery terminals, gaming consoles, or pokies, have proven very popular within the gaming environment to become one of the base elements of the gaming industry. Players, however, quickly become tired of various adaptations of gaming machines, quickly requiring new and inventive ways to represent or play games on such gaming machines. For this reason, game creators must continually invent new and innovative ways to represent games and game play to stimulate players to encourage further interest.

Typically, gaming machines of the spinning reels type, and more recently video simulations thereof, provide game outcomes which generally include a displayed set of reels appearing in columns having multiple symbols in each reels symbol locations. In this way, the symbols appear in a matrix of easily identifiable items. Generally, players place wages across fixed lines running left to right across the reels linking various symbols of the matrix. Upon a wager being placed, the reels will briefly spin before coming to rest with a set of randomly selected symbols being displayed. Symbol combinations along various pay lines are compared to winning combinations in a pay table with prizes being awarded for matching combinations.

In one known casino game including a set of reels, each reel within the set of reels has a set of numbers defining angular positions along the circumference of the reel. The set of angular positions of each reel define reel stops. The combination of reel stops within the set of reels are limited by the number of reels, the number of angular positions associated with each reel, and any further limitations provided by the casino game. At least one angular position of each reel is displayed to a user. The casino game further includes a payout table relating winning combinations of reel stops to payout values. The casino game may include a look-up table having a first and second column. Each column is divided into an identical number of rows between columns in the corresponding look-up table. The first column of each look-up table includes a set of non-repeating numbers called index pointers. Each row of the first column contains exactly one number. Each row of the second column of the first look-up table contains a set of numbers related to numbers on the faces of dice that are randomly generated.

One disadvantage of the above described casino game is that it may use a single or same look-up table. Another disadvantage of the casino game is that it does not allow secondary or bonus games to proceed based on a base or primary game. Yet another disadvantage of the casino game is that it does not directly proceed to bonus rounds. A further disadvantage of the casino game is that it provides only credit value.

Accordingly, it is desirable to provide a new casino game with bonus games that can be played on a physical gaming machine in a live casino or electronically on-line. It is also desirable to provide a casino game that uses multiple look-up tables for bonus or free rounds. It is further desirable to provide a casino game that uses a follow set feature within a look-up table to direct proceeding bonus rounds. It is still further desirable to provide a casino game that uses alternate look-up tables to proceed to bonus rounds. Therefore, there is a need in the art to provide a new casino game that meets at least one of these desires.

SUMMARY OF THE INVENTION

In a first aspect of the present invention, the present invention provides casino games, and particularly reel games. The casino game may be played on a physical gaming machine or may be implemented using one or more computer based devices. The casino game may be played over a network, on line and/or using one or more mobile devices. The casino game may be played using a stand-alone gaming machine.

In a second aspect of the present invention, the present invention provides a gaming machine including a display and a game controller in communication with the display and configured to execute computer-readable instructions causing the controller to facilitate play of a base game, detect a trigger event during the play of the base game, initiate a bonus game upon detecting the trigger event during the play of the base game with the bonus game having a bonus round, and determine an outcome of the bonus round utilizing a plurality of lookup tables with each lookup table including a set of match numbers each having a corresponding bonus payout for the bonus round and an identifier to another one of the plurality of lookup tables for a subsequent bonus round.

In a third aspect of the present invention, the present invention provides a casino game playable on an electronic device having a display including a plurality of reels and a game controller in communication with the reels of the display and configured to execute computer-readable instructions causing the controller to facilitate play of a base game, detect a trigger event during the play of the base game, initiate a bonus game upon detecting the trigger event during the play of the base game with the bonus game having a bonus round, and determine an outcome of the bonus round utilizing a plurality of lookup tables with each lookup table including a set of match numbers each having a corresponding bonus payout for the bonus round and an identifier to another one of the plurality of lookup tables for a subsequent bonus round.

In a fourth aspect of the present invention, the present invention provides a method for playing a casino game on an electronic device having a display including a plurality of reels and a game controller in communication with the reels of the display, the game controller configured to execute computer-readable instructions embedded on a computer-readable medium. The method includes the steps of facilitating play of a base game, detecting a trigger event during the play of the base game, initiating a bonus game upon detecting the trigger event during the play of the base game with the bonus game including first and second bonus rounds, determining a first outcome of the first bonus round utilizing an initial lookup table including a set of first match numbers each having a corresponding first bonus payout for the first bonus round and an identifier to a second lookup table for a second bonus round, and determining a second outcome of the second bonus round utilizing the second lookup table including a set of second match numbers each having a corresponding second bonus payout for the second bonus round and an identifier to a third lookup table for a subsequent bonus round.

In a fifth aspect of the present invention, the present invention provides a system for providing an electronic casino game to at least one player including a display device for displaying the game, a computer coupled to the display device, the computer having memory for storing the game, and at least one controller coupled to the computer and the display device, the at least one controller being configured for allowing the at least one player to be inputted into the computer. The computer is configured to facilitate play of a base game, detect a trigger event during the play of the base game, initiate a bonus game upon detecting the trigger event during the play of the base game with the bonus game having a bonus round, and determine an outcome of the bonus round utilizing a plurality of lookup tables with each lookup table including a set of match numbers each having a corresponding bonus payout for the bonus round and an identifier to another one of the plurality of lookup tables for a subsequent bonus round.

One advantage of the present invention is that a new a casino game, gaming machine, and method and system of playing a casino game is provided. Another advantage of the present invention is that the casino game uses multiple look-up tables for bonus or free rounds. Yet another advantage of the present invention is that the casino game uses a follow set feature within a look-up table to direct proceeding bonus rounds to alternate look-up tables. Still another advantage of the present invention is that the casino game relates to a base or primary game triggering a bonus or free round or a series of bonus or free rounds. A further advantage of the present invention is that the casino game uses the free round including multipliers to substantially increase winnings compared to the base game and bonus round winnings. Yet a further advantage of the present invention is that the casino game uses reel stops instead of credit value for bonus or free games.

Other advantages of the present invention will be readily appreciated as the same becomes better understood by reference to the following detailed description when considered in connection with the accompanying drawings.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 4A-4F are diagrammatic views of look-up tables for a base game triggered of a casino game with multiple reels, according to an embodiment of the present invention.

FIGS. 5A-5F are diagrammatic views of look-up tables for a bonus or free game triggered of a casino game with multiple reels, according to an embodiment of the present invention.

Figure 1:
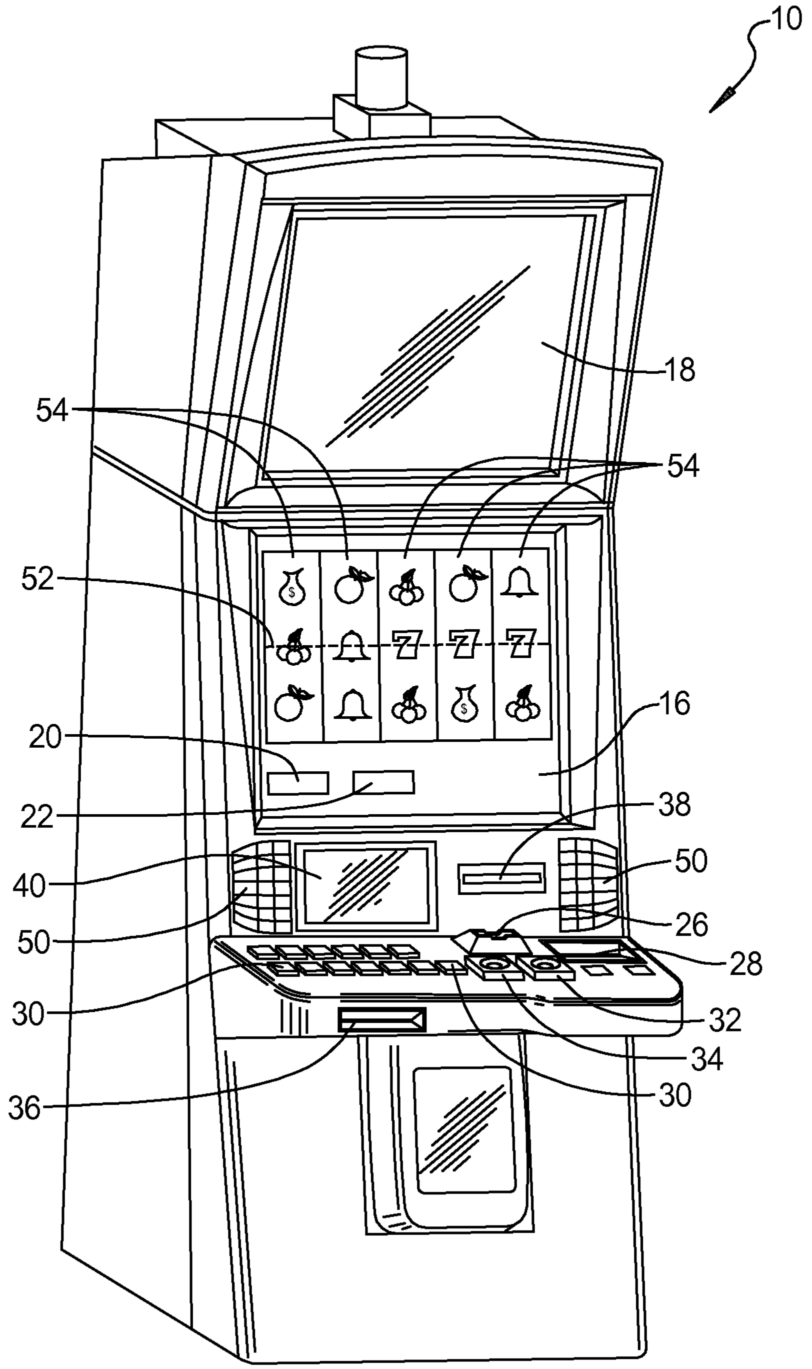
FIG. 1 is a perspective view of a gaming machine which allows for playing of a casino game with multiple reels, according to an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION OF THE INVENTION

In the following description, numerous specific details are set forth in order to provide a thorough understanding of the present invention. It should be appreciated, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention relates to a casino game including a secondary bonus or free round triggered by an outcome of a previous base or primary round, where a payout of the bonus round is determined utilizing one or more look-up tables. The casino game includes a set of reels. Each reel within the set of reels has a set of numbers defining angular positions along the circumference of the reel. The set of angular positions of each reel define reel stops. The quantity of combinations of reel stops are limited by the number of reels, the number of angular positions associated with each reel, and any further limitations provided by the casino game. At least one angular position of each reel is displayed to a user. The reel stops used in the bonus round may also be used in the base round. The casino game further includes a payout table relating winning combinations of reel stops to payout values.

The casino game includes at least a first and second look-up table. Each look-up table includes a first, second, and third column. Each column is divided into an identical number of rows between columns in the corresponding look-up table. The first column of each look-up table includes a set of non-repeating numbers called random number generator (RNG) Match numbers. Each row of the first column contains exactly one number. Each row of the second column contains a set of numbers related to the numbers along the circumferences of each reel in a set of reels. The combinations of reel stops listed in the second column are winning combinations. The value of each winning combination of the second column of each look-up table is listed in a separate payout table. Each row of the third column contains a number relating to a specific look-up table e.g., '1' relates to the first look-up table, '2' relates to the second look-up table, etc. The numbers in the third column of each table are follow set numbers. Each follow set number corresponds to unique numbers listed at the top of each look-up table used to distinguish look-up tables.

When a bonus round is first triggered, a random number is generated from a default range of numbers associated with the first look-up table. The default range of numbers encompasses all of the numbers included in the first column of the first look-up table. If the random number is not equal to any of the numbers in the first column of the first look-up table, the casino game does not display anything to the user and the bonus round ends. The user initiates a new base game and if the random number is equal to one of the numbers in the first column of the first look-up table, the corresponding row is a winning row and the set of reels begin spinning. After a predetermined amount of time, the set of reels come to rest at the angular positions specified by the numbers listed in the second column of the winning row. The user is paid a value related to the combination of reel stops listed in the payout table and the bonus round is retriggered.

In the event of a bonus round retriggering, a new random number is generated from a new range of numbers associated with a new look-up table. The new look-up table is determined by the follow set number in the third column of the winning row from the previous bonus round. The new range of numbers encompasses all of the numbers included in the first column of the new look-up table. Further, the new range of numbers may be smaller than, equal to, or greater than the range of numbers in the previous look-up table. If the new random number is not equal to any of the numbers in the first column of the new look-up table, the bonus round ends and the user initiates a new base game. If the new random number is equal to one of the numbers in the first column of the new look-up table, the corresponding row is a new winning row and the set of reels begin spinning. After a predetermined quantity of time, the set of reels come to rest at the angular positions specified by the numbers listed in the second column of the new winning row. The user is paid a value related to the combination of reel stops listed in the payout tables and the bonus round is retriggered. This process continues until a randomly generated number does not match the first column of a corresponding look-up table.

For example, a user triggers a bonus round. The number '4' is generated from a range of numbers (e.g., 1-20) associated with the first column of the first look-up table. The winning row is the row in which '4' is the RNG Match number. The reels begin spinning and a first reel comes to rest at angular position 0, a second reel comes to rest at angular position 15, a third reel comes to rest at angular position 2, a fourth reel comes to rest at angular position 1, and a fifth reel comes to rest at angular position 1. The user is paid a value related to the combination of reel stops listed in the payout table (not shown) and the bonus round is retriggered with the second look-up table being used. The second look-up table is used because the winning row of the initial bonus round listed '2' as the follow set number. The number '1' is generated from the range of numbers (e.g., 1-50) associated with the first column of the second look-up table. For example, the winning row is the row in which '1' is the RNG Match number. The reels begin spinning and a first reel comes to rest at angular position 3, a second reel comes to rest at angular position 6, a third reel comes to rest at angular position 16, a fourth reel comes to rest at angular position 8, and a fifth reel comes to rest at angular position 0. The user is paid a value related to the combination of reel stops listed in the payout table (not shown) and the bonus round is retriggered with the second look-up table being used again. The random number '25' is generated from the range of numbers (e.g., 1-50) associated with the first column of the second look-up table. The random number '25' is not included as an RNG Match value in the first column of the second look-up table. The bonus round has ended.

A further embodiment of the present invention relates to a base game triggering a free round or a series of free rounds. In addition to the features and functions of the bonus round, the free round includes multipliers used to substantially increase winnings compared to the base game and bonus round winnings.

The present invention may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

Referring to FIG. 1, one embodiment of a gaming machine 10, according to the present invention, has a support structure, housing, or cabinet which provides support for a plurality of displays, inputs, controls, and other features of a conventional gaming machine. It is configured so that a player can operate it while standing or sitting. The gaming machine 10 can be positioned on a base or stand or can be configured as a pub-style table-top game (not shown) which a player can operate preferably while sitting. It should be appreciated that the gaming machine 10 may have varying cabinet and display configurations.

Figure 2:
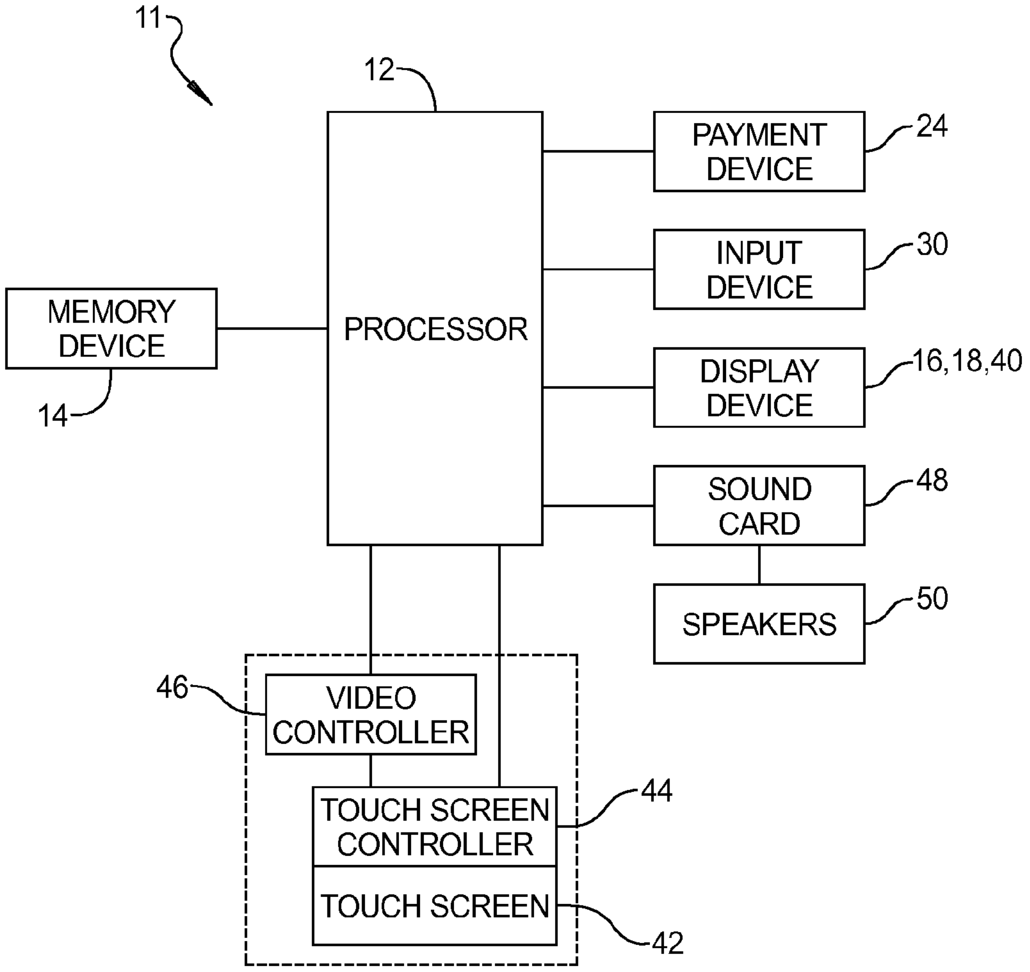
FIG. 2 is a diagrammatic view of an electronic system which allows for playing of a casino game with multiple reels, according to an embodiment of the present invention.

In one embodiment, as illustrated in FIG. 2, an electronic system for playing the casino game, according to the present invention, is generally shown at 11. The electronic system 11 may be a separate gaming system or used with the gaming machine 10 of FIG. 1. The electronic system 11 includes at least one processor 12, such as a microprocessor, a microcontroller-based platform, a suitable integrated circuit or one or more application-specific integrated circuits (ASIC's). The processor 12 is in communication with or operable to access or to exchange signals with at least one data storage or memory device 14. In one embodiment, the processor 12 and the memory device 14 reside within the cabinet of the gaming machine 10. The memory device 14 stores program code and instructions, executable by the processor 12, to control the gaming machine 10. The memory device 14 also stores other data such as image data, event data, player input data, random or pseudo-random number generators, paytable data or information, and applicable game rules that relate to the play of the casino game. In one embodiment, the memory device 14 includes random access memory (RAM), which can include non-volatile RAM (NVRAM), magnetic RAM (MRAM), ferroelectric RAM (FeRAM), and other forms as commonly understood in the gaming industry. In one embodiment, the memory device 14 includes read only memory (ROM). In one embodiment, the memory device 14 includes flash memory and/or EEPROM (electrically erasable programmable read only memory). It should be appreciated that, any other suitable magnetic, optical, and/or semiconductor memory may operate in conjunction with the electronic system 11.

In one embodiment, part or all of the program code and/or operating data described above can be stored in a detachable or removable memory device 14, including, but not limited to, a suitable cartridge, disk, CD ROM, DVD, or USB memory device. In other embodiments, part or all of the program code and/or operating data described above can be downloaded to the memory device 14 through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present invention. In one embodiment, the electronic system 11 is operable over a wireless network, for example as part of a wireless gaming system. In one such embodiment, the electronic system 11 may be a hand-held device, a mobile device, or any other suitable wireless device that enables a player to play any suitable game at a variety of different locations. In various embodiments in which the electronic system 11 is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor 12 and memory device 14 may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In one embodiment, as illustrated in FIG. 2, the electronic system 11 includes one or more display devices 16, 18, 40 controlled by the processor 12. The display devices 16, 18, 40 are preferably connected to or mounted on the cabinet of the gaming machine 10. The embodiment shown in FIG. 1 includes a central display device 16 which displays a primary or base game and an upper display device 18. This display device 16 may also display any suitable secondary game associated with the primary or base game as well as information relating to the primary or secondary game. The upper display device 18 may display the primary game, any suitable secondary game associated or not associated with the primary game and/or information relating to the primary or secondary game. These display devices may also serve as digital glass operable to advertise games or other aspects of the gaming establishment. As seen in FIG. 1, in one embodiment, the gaming machine 10 includes a credit display 20 which displays a player's current number of credits, cash, account balance, or the equivalent. In one embodiment, the gaming machine 10 includes a bet display 22 which displays a player's amount wagered. In one embodiment, the gaming machine 10 includes a player tracking display 40 which displays information regarding a player's play tracking status. It should be appreciated that these devices are in communication with the processor 12.

In another embodiment, at least one display device may be a mobile display device, such as a PDA or tablet PC, that enables play of at least a portion of the primary or secondary game at a location remote from the gaming machine 10 or electronic system 11.

The display devices 16, 18, 40 may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices 16, 18, 40 of the gaming machine 10 are configured to display at least one and preferably a plurality of game or other suitable images, symbols and indicia such as any visual representation or exhibition of the movement of objects such as mechanical, virtual, or video reels and wheels, etc., and the like.

In one embodiment, the symbols, images and indicia displayed on or of the display device may be in mechanical form. That is, the display device may include any electro-mechanical device, such as one or more mechanical objects, such as one or more rotatable wheels or reels configured to display at least one or a plurality of games or other suitable images, symbols or indicia.

As illustrated in FIG. 2, in one embodiment, the electronic system 11 includes at least one payment device 24 in communication with the processor 12. The payment device 24 may be a payment acceptor including a note, ticket or bill acceptor 28 (FIG. 1) wherein the player inserts paper money, a ticket, or voucher and a coin slot 26 (FIG. 1) where the player inserts money, coins, or tokens. In other embodiments, payment devices 24 such as readers or validators for credit cards, debit cards or credit slips may accept payment. In one embodiment, a player may insert an identification card into a card reader of the gaming machine 10. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming machine 10. In one embodiment, money may be transferred to a gaming machine 10 through electronic funds transfer. It should be appreciated that, when a player funds the gaming machine 10, the processor 12 determines the amount of funds entered and displays the corresponding amount on the credit or other suitable display as described previously.

As seen in FIGS. 1 and 2, in one embodiment the gaming machine 10 and electronic system 11 includes at least one and preferably a plurality of input devices 30 in communication with the processor 12. The input devices can include any suitable device which enables the player to produce an input signal which is received by the processor 12. In one embodiment, after appropriate funding of the gaming machine 10, the input device is a game activation device, such as a play button 32 or a pull arm (not shown) which is used by the player to start any primary or base game or sequence of events in the gaming machine 10. The play button can be any suitable play activator such as a bet one button, a max bet button, or a repeat the bet button. In one embodiment, upon appropriate funding, the gaming machine 10 begins the game play automatically. In another embodiment, upon the player engaging one of the play buttons, the gaming machine 10 automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming machine 10.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. In one embodiment, the gaming machine 10 includes at least one card reader 38 in communication with the processor 12. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. It should be appreciated that any suitable payout mechanism, such as funding to the player's electronically recordable identification card or smart card, may be implemented in accordance with the gaming machine 10.

In one embodiment, as mentioned above and as seen in FIG. 2, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming machine 10 or the electronic system 11 by touching the touch-screen at the appropriate locations. One such input device is a conventional touch-screen button panel.

The electronic system 11 may further include a plurality of communication ports for enabling communication of the processor with external peripherals, such as external video sources, expansion buses, game or other displays, a SCSI port, or a keypad.

In one embodiment, as seen in FIG. 2, the electronic system 11 includes a sound generating device controlled by one or more sounds cards 48 which function in conjunction with the processor 12. In one embodiment, the sound generating device includes at least one and preferably a plurality of speakers 50 or other sound generating hardware and/or software for generating sounds, such as by playing music for the primary and/or secondary game or by playing music for other modes of the gaming machine 10, such as an attract mode. In one embodiment, the gaming machine 10 provides dynamic sounds coupled with attractive multimedia images displayed on one or more of the display devices to provide an audio-visual representation or to otherwise display full-motion video with sound to attract players to the gaming machine 10. During idle periods, the gaming machine 10 may display a sequence of audio and/or visual attraction messages to attract potential players to the gaming device. The videos may also be customized to provide any appropriate information.

In one embodiment, the gaming machine 10 may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

The gaming machine 10 can incorporate any suitable wagering game as the primary or base game. The gaming machine 10 may include some or all of the features of conventional gaming machines or devices. In one embodiment, the primary or base game may be any suitable reel-type game susceptible to representation in an electronic or electromechanical form, which in one embodiment produces a random outcome based on probability data at the time of or after placement of a wager.

In one embodiment, as illustrated in FIG. 1, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming machine 10 awards prizes after the reels of the primary or base game stop spinning if specified types and/or configurations of indicia or symbols occur on an active payline or otherwise occur in a winning pattern, occur on the requisite number of adjacent reels and/or occur in a scatter pay arrangement.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. It should be appreciated that, in one embodiment, the bonus or secondary game is similar to the base or primary game.

Figure 2A:
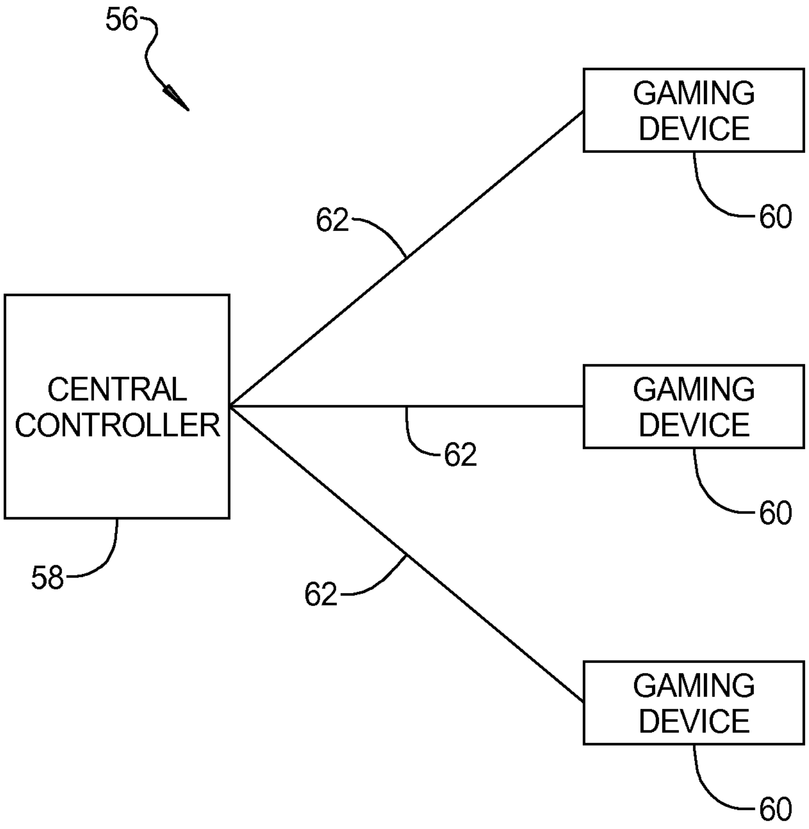
FIG. 2A is a diagrammatic view of a gaming system which allows for playing of a casino game with multiple reels, according to an embodiment of the present invention.

In one embodiment, as illustrated in FIG. 2A, a gaming system for playing the casino game, according to the present invention, is generally shown at 56. The gaming system 56 includes at least one central computer or controller 58 and one or more of gaming controllers or devices 60 in communication with each other and/or the at least one central controller 58 through a data network or remote communication link 62. In this embodiment, the central server, central controller, central computer, or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, a plurality of the gaming devices 60 are capable of being connected together through a data network. In one embodiment, the data network is a local area network (LAN), in which one or more of the gaming devices 60 are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices 60 may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device 60 can be viewed at the gaming device 60 with at least one internet browser. In this embodiment, operation of the gaming device 60 and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present invention may be employed in a server-based gaming system. In one such embodiment, as described above, one or more gaming devices 60 are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device 60 at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The methodologies described herein may be implemented by various means depending upon applications according to particular examples. For example, such methodologies may be implemented in hardware, firmware, software, or combinations thereof. In a hardware implementation, for example, the controller or processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be appreciated, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,"

"determining" or the like refer to actions or processes of a specific apparatus, such as a special purpose computer or a similar special purpose electronic computing device. In the context of this description, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

For clarity in discussing the various functions of the system, multiple computers and/or servers are discussed as performing different functions. These different computers (or servers) may, however, be implemented in multiple different ways such as modules within a single computer, as nodes of a computer system, etc. The functions performed by the system (or nodes or modules) may be centralized or distributed in any suitable manner across the system and its components, regardless of the location of specific hardware. Furthermore, specific components of the system may be referenced using functional terminology in their names. The function terminology is used solely for purposes of naming convention and to distinguish one element from another in the following discussion. Unless otherwise specified, the name of an element conveys no specific functionality to the element or component. It should be appreciated that, in selected embodiments, the software, hardware, and associated components of the system may be programmed and configured to implement one or more embodiments described herein. It should also be appreciated that the various aspects of the system may be exemplified as software, modules, nodes, etc. of a computer or server.

Figure 3:
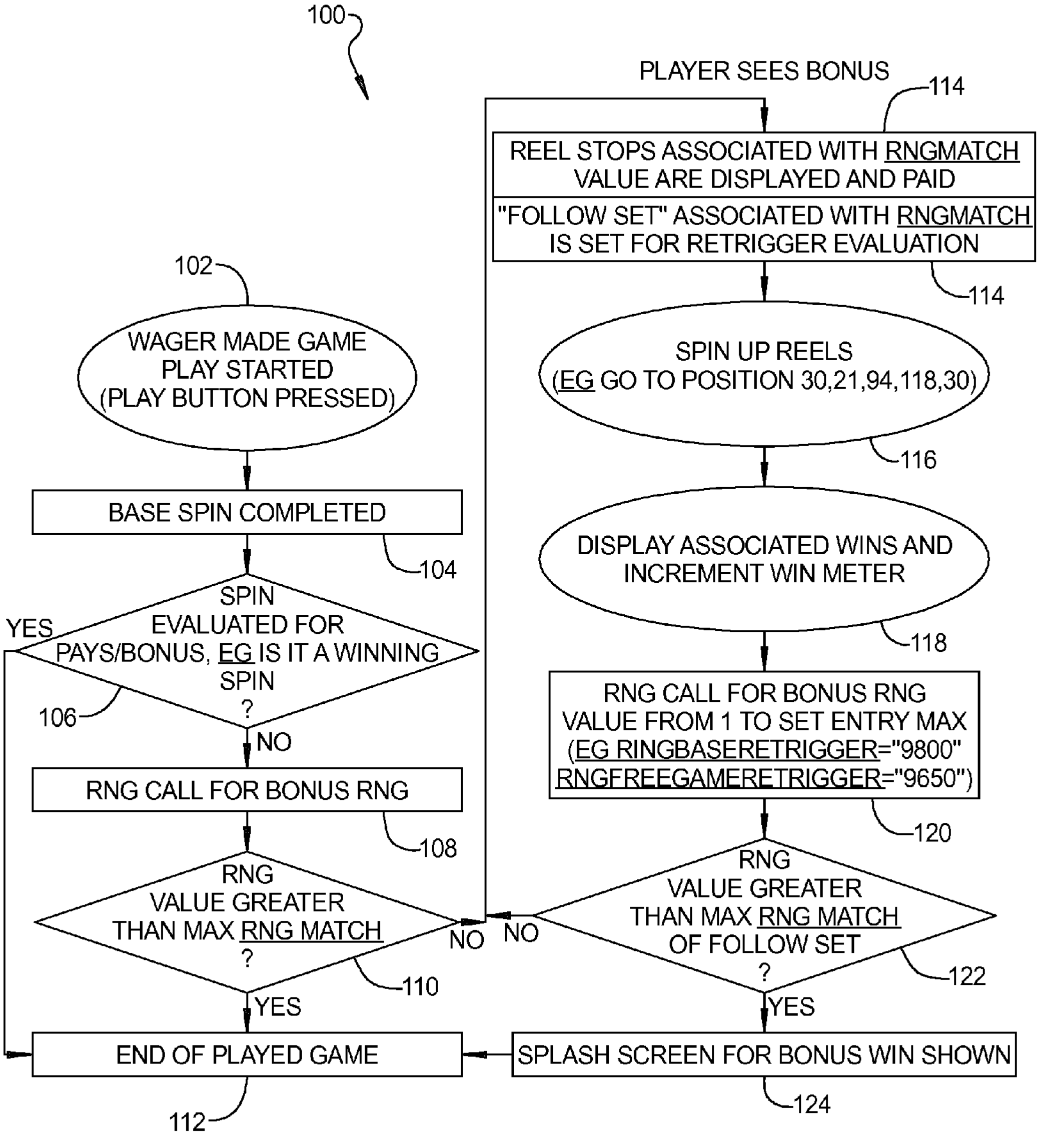
FIG. 3 is a flowchart of one embodiment of a method of playing a casino game with multiple reels, according to an embodiment of the present invention.

Referring to FIG. 3, one embodiment of a method of playing a casino game with multiple reels, according to the present invention, is shown at 100. The method 100 begins in block 102 and includes making a wager on the casino game and starting play, for example, by pressing the play button. Once the play button is pressed, the processor 12 activates spinning of the reels and the reels spin. The method 100 advances to block 104 and includes completing the base spin. For example, the processor 12 stops the spinning of the reels and the reels stop. The method 100 advances to block 106 and includes evaluating the spin for pays/bonus, i.e., is it a winning spin. For example, the processor 12 determines if a match is made for a payout and/or a bonus.

If no, the method 100 advances to block 108 and includes calling the random number generator (RNG) for a bonus RNG. For example, the processor 12 causes the RNG to generate a RNG value to be used in the look-up table. The method 100 advances to block 110 and includes determining whether the RNG value is greater than a maximum (max) RNG match. For example, the processor 12 determines if the RNG value is greater than the values in the RNG Match of the look-up table. For example, in FIG. 4A, the processor 12 determines if the RNG value is greater than one of the values in a first column of the look-up table. If so, the method 100 advances to block 112 and includes ending the play of the casino game. In addition, in block 106, if the spin evaluated for pays/bonus is a winning spin, the method advances to block 112 previously described. It should be appreciated that the player initiates a new base game and if the random number is equal to one of the numbers in the first column of the first look-up table, the corresponding row is a winning row and the set of reels begin spinning, after a predetermined amount of time, the set of reels come to rest at the angular positions specified by the numbers listed in the second column of the winning row, and the user is paid a value related to the combination of reel stops listed in the payout table and the bonus round is triggered. It should also be appreciated that, if the play of the casino game is ended, the player must make a new wager and press the play button again.

In block 110, if the RNG value is not greater than the maximum (max) RNG Match value, the method advances to block 114 and includes displaying and paying the reel stops associated with the RNG match. For example, in FIG. 4A, the processor 12 displays the reel stops of a second column of the look-up table associated with the RNG match number in the first column of the look-up table and pays the amount associated with the reel stops. Also, in block 114, the method includes setting for retrigger evaluation "follow set" associated with the RNG match. For example, in FIG. 4A, the processor 12 sets the Follow set number from a third column of the look-up table associated with the RNG match in the first column of the look-up table.

The method advances to block 116 and includes spinning up the reels. For example, the processor 12 activates spinning of the reels and the reels spin. The method advances to block 118 and includes displaying the associated wins on the display and incrementing a win meter. For example, the processor 12 displays the associated wins and increments a win meter. The method advances to block 120 and includes calling, by the RNG, for the Bonus RNG value from one (1) to set entry maximum (max). For example, the processor 12 causes the RNG to generate the Bonus RNG value. The method advances to block 122 and includes determining whether the Bonus RNG value is greater than the max RNG Match of the Follow Set. For example, the processor determines whether the Bonus RNG value is greater than the values in the first column of the Follow Set such as in FIG. 4B or 5A. If not, the method advances to block 114 previously described. If so, the method advances to block 124 and includes splashing the screen or display for bonus win show. For example, the processor 12 cause the display to show the bonus win. The method then advances to block 112 previously described. It should be appreciated that when a bonus round is first triggered, a random number is generated from a default range of numbers associated with the first column of the first look-up table and, if the random number is not equal to any of the numbers in the first column of the look-up table, the casino game does not display anything to the user and the bonus round ends.

In the event of a bonus round retriggering, a new random number is generated from a new range of numbers associated with a new look-up table. The new look-up table is determined by the follow set number in the third column of the winning row from the previous bonus round. The new range of numbers encompasses all of the numbers included in the first column of the new look-up table. Further, the new range of numbers may be smaller than, equal to, or greater than the range of numbers in the previous look-up table. If the new random number is not equal to any of the numbers in the first column of the new look-up table, the bonus round ends and the user initiates a new base game. If the new random number is equal to one of the numbers in the first column of the new look-up table, the corresponding row is a new winning row and the set of reels begin spinning. After a predetermined quantity of time, the set of reels come to rest at the angular positions specified by the numbers listed in the second column of the new winning row. The player is paid a value related to the combination of reel stops listed in the payout tables and the bonus round is retriggered. It should be appreciated that this process continues until a randomly generated number does not match the first column of a corresponding look-up table.

Referring to FIGS. 4A through 4F, examples of lookup tables for bonus rounds when a base or primary game triggered is shown. Each look-up table includes a first, second, and third column. Each column is divided into an identical number of rows between columns in the corresponding look-up table. The first column of each look-up table includes a set of non-repeating numbers called random number generator (RNG) Match numbers. Each row of the first column contains exactly one number. Each row of the second column contains a set of numbers related to the numbers along the circumferences of each reel in a set of reels. The combinations of reel stops listed in the second column are winning combinations. The value of each winning combination of the second column of each look-up table is listed in a separate payout table. Each row of the third column contains a number relating to a specific look-up table e.g., '1' relates to the first look-up table, '2' relates to the second look-up table, etc. The numbers in the third column of each table are follow set numbers. Each follow set number corresponds to unique numbers listed at the top of each look-up table used to distinguish look-up tables. In the figures illustrated, there are six lookup tables, one for each set from Set 0 to Set 5. In the first column of each look-up table, there is an RNG Match number. In the examples, the RNG Match number may be from one (1) to ten (10). In the second column of each lookup table, there is a Reel stops numbers for each reel. In the examples, the Reel stops numbers for each reel may be from zero (0) to thirty-six (36). In the third column of each lookup table, there is a Follow Set number. In the examples, the Follow Set number may be from zero (0) to five (5). It should be appreciated that the Follow Set number corresponds to the Set number of the lookup table. It should also be appreciated that the range of numbers may vary for each column of the look-up tables.

Referring to FIGS. 5A through 5F, examples of lookup tables when either a bonus, free, or secondary game triggered is shown. Each look-up table includes a first, second, and third column. Each column is divided into an identical number of rows between columns in the corresponding look-up table. The first column of each look-up table includes a set of non-repeating numbers called random number generator (RNG) Match numbers. Each row of the first column contains exactly one number. Each row of the second column contains a set of numbers related to the numbers along the circumferences of each reel in a set of reels. The combinations of reel stops listed in the second column are winning combinations. The value of each winning combination of the second column of each look-up table is listed in a separate payout table. Each row of the third column contains a number relating to a specific look-up table e.g., '1' relates to the first look-up table, '2' relates to the second look-up table, etc. The numbers in the third column of each table are follow set numbers. Each follow set number corresponds to unique numbers listed at the top of each look-up table used to distinguish look-up tables. In the figures illustrated, there are six lookup tables, one for each set from Set 0 to Set 5. In the first column of each look-up table, there is an RNG Match number. In the examples, the RNG Match number may be from one (1) to ten (10). In the second column of each lookup table, there is a Reel stops numbers for each reel. In the examples, the Reel stops numbers for each reel may be from zero (0) to thirty-six (36). In the third column of each lookup table, there is a Follow Set number. In the examples, the Follow Set number may be from zero (0) to five (5). It should be appreciated that the Follow Set number corresponds to the Set number of the lookup table. It should be appreciated that the range of numbers may vary for each column of the look-up tables.

Figure 6:
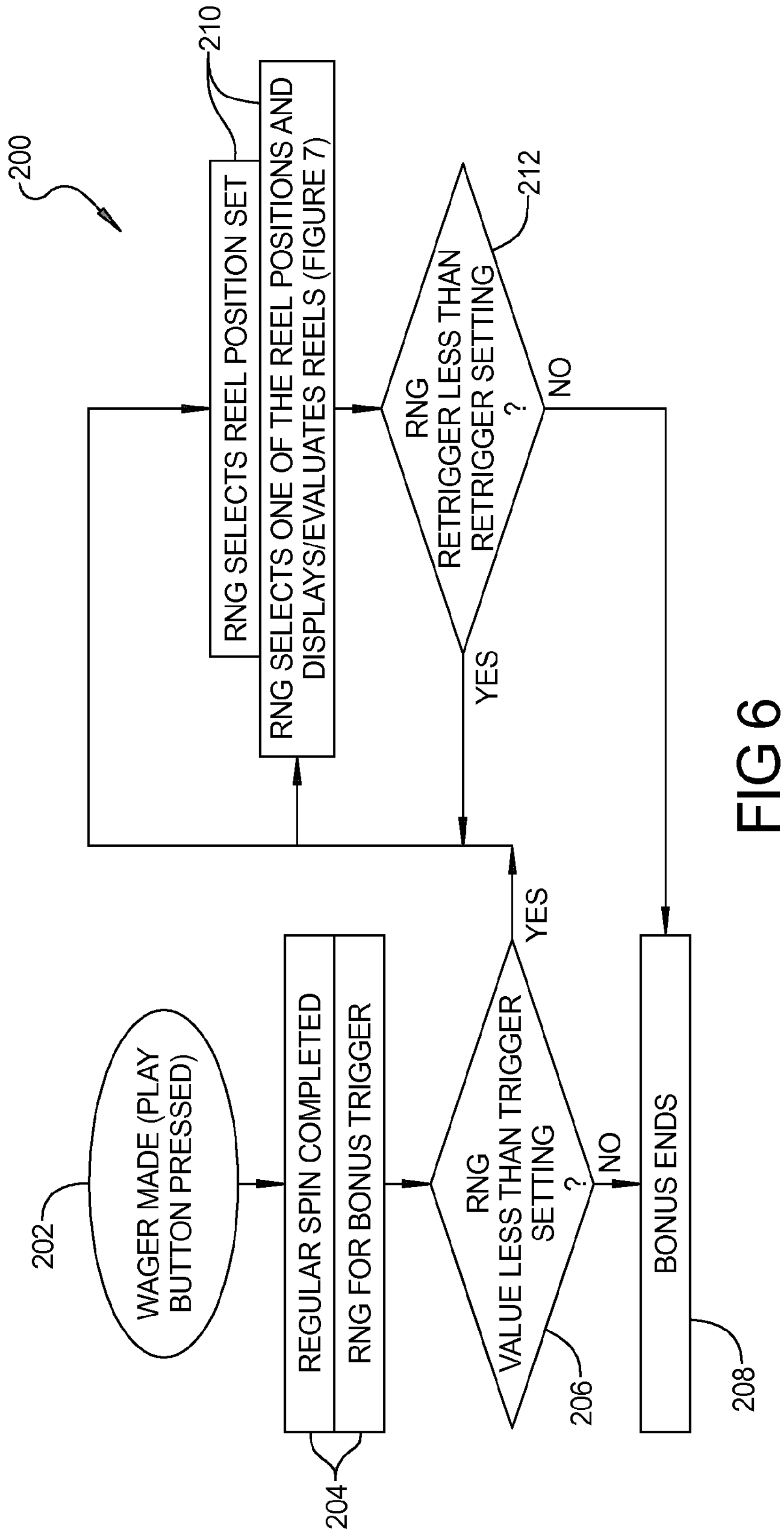
FIG. 6 is a flowchart of another embodiment of a method of playing a casino game with multiple reels, according to an embodiment of the present invention.
Figure 7:
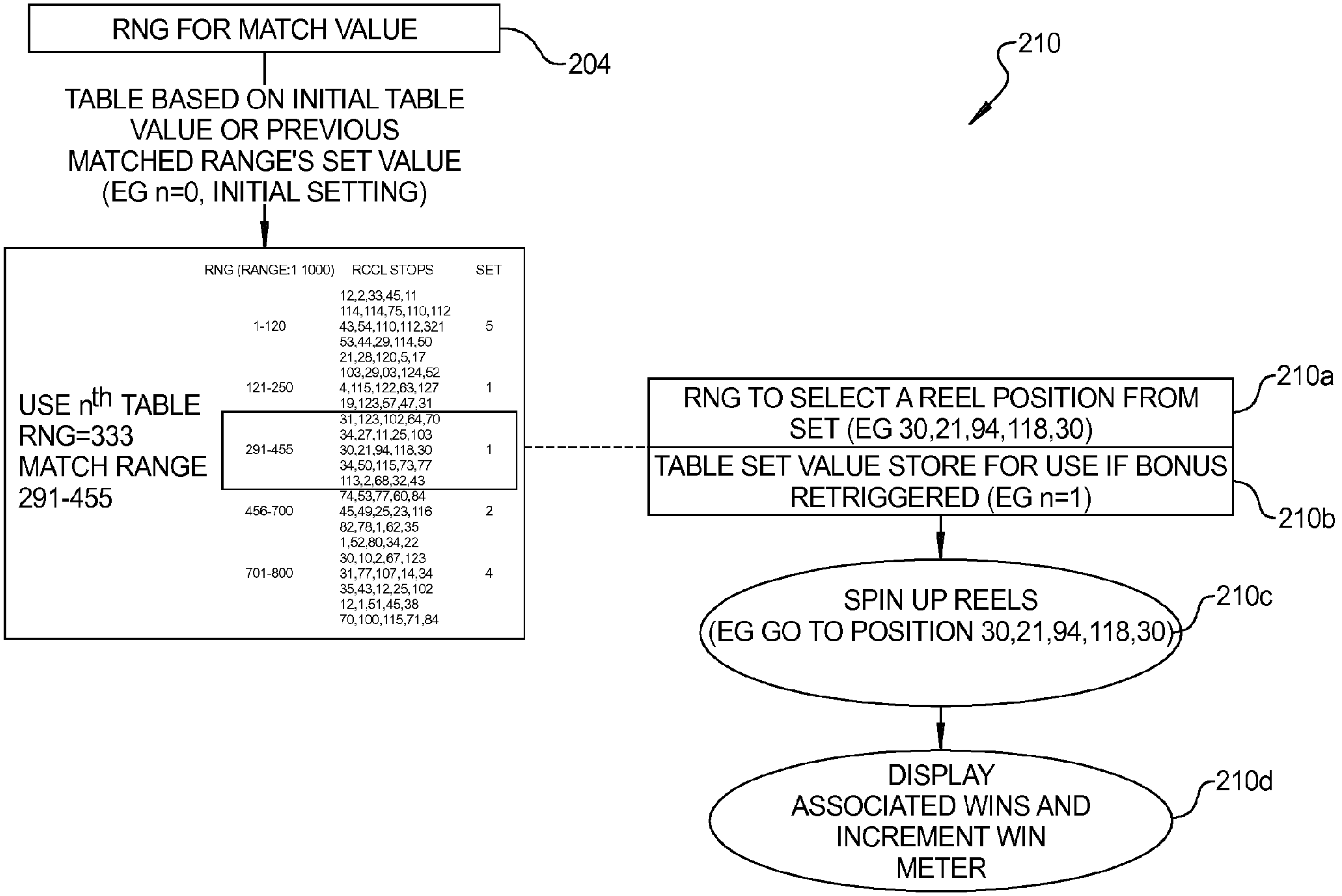
FIG. 7 is a flowchart of a portion of a method of playing a casino game with multiple reels, according to an embodiment of the present invention, of FIG. 6.

Referring to FIG. 6, another embodiment of a method of playing a casino game with multiple reels, according to the present invention, is shown at 200. The method 200 begins in block 202 and includes making a wager on the casino game and starting play, for example, by pressing the play button. Once the play button is pressed, the processor 12 activates spinning of the reels and the reels spin. The method 200 advances to block 204 and includes completing the regular or base spin and includes calling the random number generator (RNG) for a Bonus Trigger. For example, the processor 12 causes the RNG to generate a RNG for Match value (FIG. 7). The method 200 advances to block 206 and includes determining with the RNG Match value is less than the Bonus Trigger or trigger setting. For example, the processor 12 determines if the RNG Match value is less than the values in the first column of the look-up table. If no, the method 200 advances to block 208 and includes ending the play of the casino game.

In block 206, if the RNG value is less than the Bonus Trigger or trigger setting, the method 200 advances to block 210 and includes selecting, by the RNG, the reel position set. For example, the processor 12 selects the reel position set of the second column of the look-up table based on the RNG Match value of the first column of the look-up table. Also, in block 210, the method 200 includes selecting, by the RNG, one of the reel positions and displays/evaluates reels to be described in FIG. 7. The method 200 advances to block 212 and includes determining whether the RNG retrigger value is less than the retrigger setting. For example, the processor 12 determines whether the RNG retrigger value is less than the values in the third column of the Follow Set look-up table. If so, the method 200 advances to block 210 previously described. If not, the method 200 advances to block 208 previously described.

Referring to FIG. 7, the details of block 210 is shown. In block 210, the method 200 starts in block 210*a* and selects, by the RNG, a reel position from a reel set. For example, the reel set may be values of 30, 21, 94, 118, and 30. The method 200 in block 210*b* includes storing table set value for use if bonus is triggered (e.g., n=1). For example, the processor 12 sets the value from the third column of the look-up table. The method 200 advances 200 advances to block 210*c* and includes spinning up the reels. For example, the reels are spun to the position of the reel set, for example, 30, 21, 94, 118, and 30. The method 200 then advances to block 210*d* and includes displaying associated wins and increments a win meter as previously described.

Figure 8:
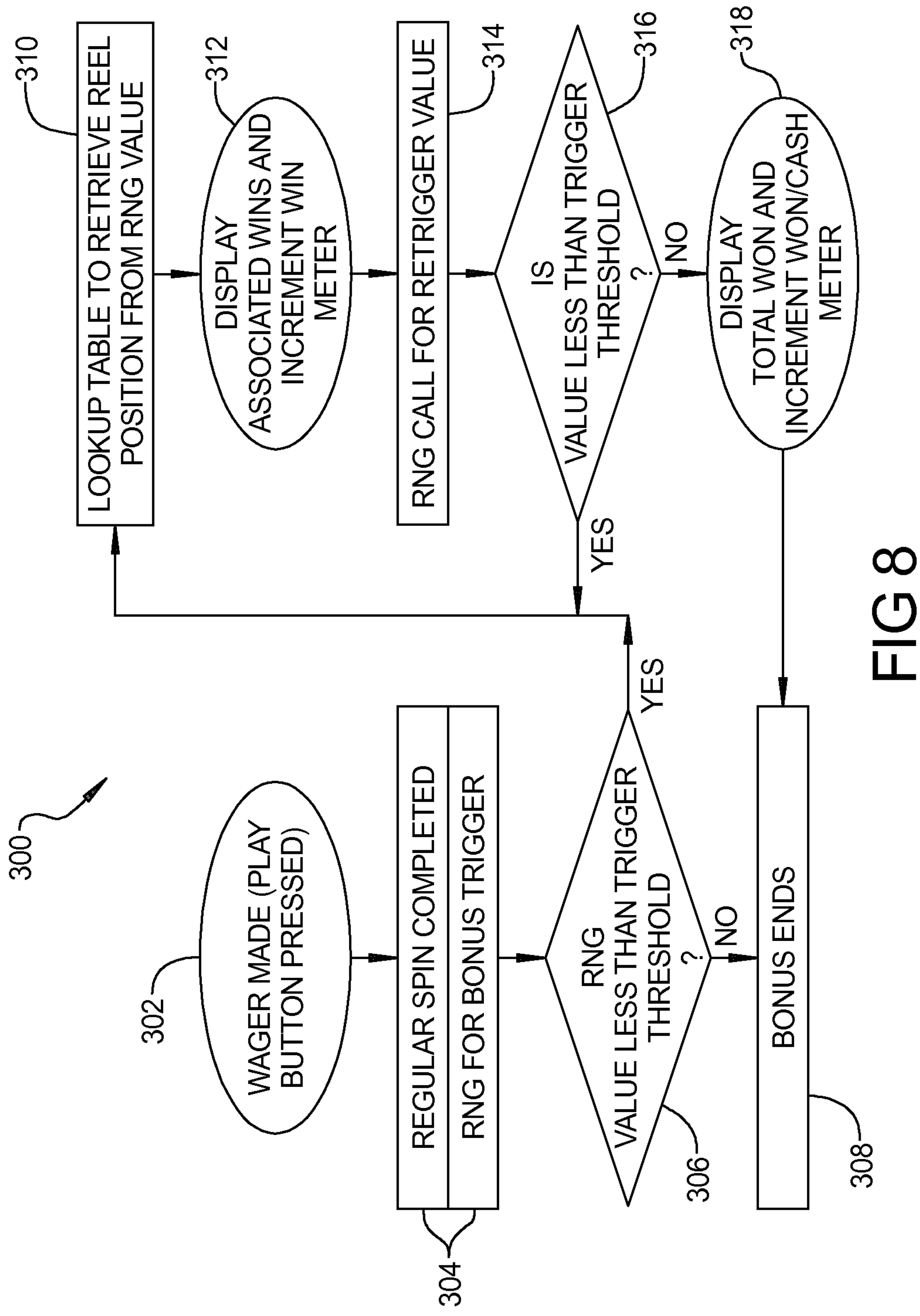
FIG. 8 is a flowchart of yet another embodiment of a method of playing a casino game with multiple reels, according to an embodiment of the present invention.

Referring to FIG. 8, yet another embodiment of a method of playing a casino game with multiple reels, according to the present invention, is shown at 300. The method 300 begins in block 302 and includes making a wager on the casino game and starting play, for example, by pressing the play button. Once the play button is pressed, the processor 12 activates spinning of the reels and the reels spin. The method 300 advances to block 304 and includes completing the regular or base spin and includes calling the random number generator (RNG) for a Bonus Trigger. For example, the processor 12 causes the RNG to generate a RNG value. The method 300 advances to block 306 and includes determining whether the RNG value is less than the Bonus Trigger or trigger setting. For example, the processor 12 determines if the RNG value is less than the values in the first column of the look-up table. If no, the method 300 advances to block 308 and includes ending the play of the casino game.

In block 306, if the RNG value is less than the Bonus Trigger or trigger setting, the method 300 advances to block 310 and includes retrieving reel positions of the RNG value from the look-up table. For example, the processor 12 retrieves the reel positions from the second column of the lookup table associated with the matching RNG value of the first column of the look-up table. The method 300 then advances to block 312 and includes displaying associated wins and increments a win meter. For example, the processor 12 displays the associated wins on the display and increments the win meter. The method 300 advances to block 314 and includes calling, by the RNG, for a retrigger value. For example, the processor 12 causes the RNG to generate a RNG retrigger value. The method 300 advances to block 316 and includes determining whether the RNG retrigger value is less than the trigger threshold. For example, the processor 12 determines whether the RNG retrigger value is less than the values in the first column of the Follow Set look-up table. If so, the method 300 advances to block 310 previously described. If not, the method 300 advances to block 318 and includes displaying total won and incrementing a won/cash meter. For example, the processor 12 displays the total wins and increments the win meter. The method 300 then advances to block 308 previously described.

The following are examples of a bonus or free play round being triggered or not triggered:

Base Game Loss, Instant FREE PLAY not Triggered

Player makes wager and presses spin button. Base Game Reel RNG initiated. Reels spin up displays no wins. Free play RNG initiated (example RNG value=888, win meter=0, table set=0). No display to player when not triggered.

Base Game Loss, Instant FREE PLAY Hit (not Retriggered)

Player makes wager and presses spin button. The Base Game Reel RNG initiated. Reels spin up displays no wins. Free play RNG initiated (example RNG value=55, win meter=0, table set=0). Use lookup table to obtain reel positions (example 73, 94, 93, 33, 21). Spin up reels and pay wins 175. Set bonus table value (example table value=2). Increment win meter (win meter=175). Retrigger Bonus RNG initiated (example RNG value=999, win meter=175, table set=2). Bonus not retriggered—bonus over, display total win Base Game and bonus wins.

Base Game Loss, Instant FREE PLAY Hit (Retriggered)

Player makes wager and presses spin button. Base Game Reel RNG initiated. Reels spin up displays no wins. Bonus RNG initiated (example RNG value=55, win meter=0, table set=0). Use lookup table to obtain reel positions (example 73, 94, 93, 33, 21). Spin up reels and pay wins 175. Set bonus table value (example table value=2). Increment win meter (win meter=175). Retrigger Bonus RNG initiated (example RNG value=23, win meter=175, table set=2). Use lookup table to obtain reel positions (example 138, 121, 141, 136, 41). Spin up reels and pay wins 375. Set bonus table value (example table value=2). Increment win meter (win meter=550). Retrigger Bonus RNG initiated (example RNG value=13, win meter=550, table set=2). Use lookup table to obtain reel positions (example 103, 88, 49, 108, 61). Spin up reels and pay wins 350. Set bonus table value (example table value=2 [cell N16]). Increment win meter (win meter=900). Retrigger Bonus RNG initiated (example RNG value=455, win meter=900, table set=2). Bonus not retriggered—bonus over, display total win Base Game and bonus won.

Base Game Bonus Games [Bonus Hit], FREE Games not Triggered

Player makes wager and presses spin button. Base Game Reel RNG initiated. Reels spin up displays free games triggered and pay any line wins (example, pay 50 credits). Picking game to determine number of free games and multiplier (example 5 free games at 2× multiplier). For each free game run RNG to get win and/or bonus(es). Base Game Reel RNG initiated. Reels spin up displays evaluate any wins. Bonus RNG initiated (Note: smaller RNG range [ex 1-1040] during free game bonus). Show if bonus hit otherwise no display to player. Example (5 free games at 2× multiplier, pay 50 from base game spin). Spin 1 (win meter=50). Base Game Reel RNG initiated. Reels spin up displays no wins. Bonus RNG initiated (example RNG value=1014, table set=0). No display to player when not triggered. Spin 2 (win meter=50). Base Game Reel RNG initiated. Reels spin up displays line win of 225×2=550. Free Play RNG initiated (example RNG value=765, table set=0). No display to player when not triggered. Spin 3 (win meter=600). Base Game Reel RNG initiated. Reels spin up displays no wins. Bonus RNG initiated (example RNG value=55, table set=0). Use lookup table to obtain reel positions (example 73, 94, 93, 33, 21). Spin up reels and pay wins 175×2=350. Set bonus table value (example table value=2). Increment win meter (win meter=950). Retrigger Bonus RNG initiated (example RNG value=999, table set=2). Bonus not retriggered—move on to next free spin. Spin 4 (win meter=950). Base Game Reel RNG initiated. Reels spin up displays line win of 125×2=250. Increment win meter (win meter=1200). Bonus RNG initiated (example RNG value=35, table set=0). Use lookup table to obtain reel positions (example 138, 74, 58, 57, 30). Spin up reels and pay wins 100×2=200. Set bonus table value (example table value=0). Increment win meter (win meter=1400). Retrigger Bonus RNG initiated (example RNG value=65, table set=0). Use lookup table to obtain reel positions (example 30, 101, 72, 50, 76). Spin up reels and pay wins 375×2=750. Set bonus table value (example table value=3). Increment win meter (win meter=2150). Retrigger Bonus RNG initiated (example RNG value=1, table set=3). Use lookup table to obtain reel positions (example 83, 80, 93, 110, 47). Spin up reels and pay wins 350×2=700. Set bonus table value (example table value=3). Increment win meter (win meter=2850). Retrigger Bonus RNG initiated (example RNG value=455, table set=3). Bonus not retriggered—move on to next free spin. Spin 5 (win meter=2850). Base Game Reel RNG initiated. Reels spin up displays evaluate any wins. Bonus RNG initiated (example RNG value=234, table set=0). No display to player when not triggered. Bonus RNG initiated (example RNG value=888, win meter=2850, table set=0). Bonus not triggered—bonus over, display total win Base Game and bonuses (example total win=2850).

Base Game Free Games [Bonus Hit], Bonus not Triggered

Player makes wagers and presses spin button. Base Game Reel RNG initiated. Reels spin up displays free games triggered and pay line wins (example, pay 50 credits). Picking game to determine number of free games and multiplier (example 5 free games at 2× multiplier). For each free game run RNG to get win and/or bonus(es) (example use above example, free games win=2850). Bonus RNG initiated (example RNG value=55, win meter 2850, table set=0). Use lookup table to obtain reel positions (example 73, 94, 93, 33, 21). Spin up reels and pay wins 175. Set bonus table value (example table value=2). Increment win meter (win meter=3025). Retrigger Bonus RNG initiated (example RNG value=999, win meter 3025, table set=2). Bonus not triggered—bonus over, display total win Base Game and bonuses (example total win=3025). It should be appreciated that the casino game uses the free round including multipliers to substantially increase winnings compared to the base game and bonus round winnings.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A gaming machine comprising:

a display device configured to display a plurality of reels that are spinned and stopped during play of a base game;

an accepting device configured to accept a physical item of monetary value, the monetary value establishing a credit balance, the credit balance being increasable and decreasible based at least on wagering activity;

at least one input device configured to receive an input to cause an initiation of a payout associated with the credit balance; and a game controller in communication with the display device and configured to execute computer-readable instructions causing the game controller to:

facilitate play of the base game by spinning and stopping the reels on the display device in response to placing a wager, the wager decreasing the credit balance;

detect a trigger event during play of the base game;

upon detecting the trigger event during play of the base game, initiate a bonus game, the bonus game having at least two bonus rounds including a first bonus round and a second bonus round, wherein during each bonus round the plurality of reels are spinned and stopped;

determine a first random number generated by a random number generator;

determine an initial lookup table for the first bonus round, the initial lookup table selected from a plurality of lookup tables, wherein each of the plurality of lookup tables include a set of match numbers corresponding to generated random numbers, each match number having (i) a corresponding bonus payout and (ii) an identifier identifying a second one of the plurality of lookup tables to be utilized for the second bonus round, the second one of the plurality of lookup tables being different than the initial lookup table;

initiate the first bonus round and determine a first bonus payout of the first bonus round utilizing the initial lookup table and the first random number;

determine a second random number generated by the random number generator;

initiate the second bonus round and determine a second bonus payout for the second bonus round utilizing the second one of the plurality of lookup tables and the second random number; and detect the input to cause the initiation of the payout, via the at least one input device.

2. The gaming machine as set forth in claim 1, wherein each reel has a plurality of reel stop positions and the initial lookup table further includes a set of characters corresponding to each of the set of match numbers with each character of the set of characters representing a reel stop position of a respective reel.

3. The gaming machine as set forth in claim 2, wherein the controller further includes computer-readable instructions causing the controller to:

initiate spinning of the plurality of reels;

cause each of the plurality of reels to stop spinning at the respective reel stop position identified in the set of characters set forth in the initial lookup table which corresponds to the match number matching the determined first random number; and provide a payout to a player.

4. The gaming machine as set forth in claim 1, wherein the computer-readable instructions causing the controller to determine the outcome of the bonus round further causes the controller to:

determine that the first random number does not match one of the match numbers set forth in the initial lookup table; and end the bonus game.

5. The gaming machine as set forth in claim 1, wherein each reel has a plurality of reel stop positions and the trigger event includes a preset winning combination of the respective reel stop positions of the plurality of reels.

6. The gaming machine as set forth in claim 1, wherein each reel has a plurality of reel stop positions, and the trigger event includes a non-winning combination of the respective reel stop positions of the plurality of reels.

7. A non-transitory computer-readable medium storing computer-readable instructions, configured to conduct a casino game playable on an electronic device having a display device configured to display a plurality of reels that are spinned and stopped during play of a base game, an accepting device configured to accept a physical item of monetary value, the monetary value establishing a credit balance, the credit balance being increasable and decreasible based at least one wagering activity, at least one input device configured to receive an input to cause an initiation of a payout associated with the credit balance, and a game controller in communication with the display device and configured to execute the computer-readable instructions causing the game controller to:

facilitate play of the base game by spinning and stopping the reels on the display device in response to placing a wager, the wager decreasing the credit balance;

detect a trigger event during play of the base game;

upon detecting the trigger event during play of the base game, initiate a bonus game, the bonus game having at least two bonus rounds including a first bonus round and a second bonus round, wherein during each bonus round the plurality of reels are spinned and stopped;

determine a first random number generated by a random number generator;

determine an initial lookup table for the first bonus round, the initial lookup table selected from a plurality of lookup tables, wherein each of the plurality of lookup tables include a set of match numbers corresponding to generated random numbers, each match number having (i) a corresponding bonus payout and (ii) an identifier identifying a second one of the plurality of lookup tables to be utilized for the second bonus round, the second one of the plurality of lookup tables being different than the initial lookup table;

initiate the first bonus round and determine a first bonus payout of the first bonus round utilizing the initial lookup table and the first random number;

determine a second random number generated by the random number generator;

initiate the second bonus round and determine a second bonus payout for the second bonus round utilizing the second one of the plurality of lookup tables and the second random number; and detect the input to cause the initiation of the payout, via the at least one input device.

8. The casino game as set forth in claim 7, wherein the plurality of reels has a plurality of reel stop positions and the initial lookup table further includes a set of characters corresponding to each of the set of match numbers with each character of the set of characters representing a reel stop position of a respective reel.

9. The casino game as set forth in claim 8, wherein the controller further includes computer-readable instructions causing the controller to:

initiate spinning of the plurality of reels;

cause each of the plurality of reels to stop spinning at the respective reel stop position identified in the set of characters set forth in the initial lookup table which corresponds to the match number matching the determined first random number; and provide a payout to the user.

10. The casino game as set forth in claim 8, wherein the computer-readable instructions causing the controller to determine the outcome of the bonus round further causes the controller to:

determine that the first random number does not match one of the match numbers set forth in the initial look up table; and end the bonus game.

11. A method for playing a casino game on an electronic device having a display device configured to display a plurality of reels that are spinned and stopped during play of a base game, an accepting device configured to accept a physical item of monetary value, the monetary value establishing a credit balance, the credit balance being increasable and decreasible based at least on wagering activity, at least one input device configured to receive an input to cause an initiation of a payout associated with the credit balance, and a game controller in communication with the display device, the game controller configured to execute computer-readable instructions embedded on a computer-readable medium, the method comprising the steps of:

facilitating play of the base game by spinning and stopping the reels on the display device in response to placing a wager, the wager decreasing the credit balance;

detecting a trigger event during play of the base game;

upon detecting the trigger event during play of the base game, initiating a bonus game, the bonus game having at least two bonus rounds including a first bonus round and a second bonus round, wherein during each bonus round the plurality of reels are spinned and stopped;

determining a first random number generated by a random number generator;

determining an initial lookup table for the first bonus round, the initial lookup table selected from a plurality of lookup tables, wherein each of the plurality of lookup tables include a set of match numbers corresponding to generated random numbers, each match number having (i) a corresponding bonus payout and (ii) an identifier identifying a second one of the plurality of lookup tables to be utilized for the second bonus round, the second one of the plurality of lookup tables being different than the initial lookup table;

initiating the first bonus round and determine a first bonus payout of the first bonus round utilizing the initial lookup table and the first random number;

determining a second random number generated by the random number generator;

initiating the second bonus round and determine a second bonus payout for the second bonus round utilizing the second one of the plurality of lookup tables and the second random number; and detecting the input to cause the initiation of the payout, via the at least one input device.

12. The method as set forth in claim 11, wherein the plurality of reels has a plurality of reel stop positions and the initial lookup table further includes a set of characters corresponding to each of the set of first match numbers with each character of the set of characters representing a reel stop position of a respective reel, and the method further comprises the steps of:

initiating spinning of the plurality of reels;

causing each of the plurality of reels to stop spinning at the respective reel stop position identified in the set of characters set forth in the first lookup table which corresponds to a first match number matching the determined first random number; and providing the first bonus payout to the user.

13. The method as set forth in claim 11, wherein the second one of the plurality of lookup tables further includes a set of characters corresponding to a second set of second match number with each character of the set of characters representing a reel stop position of a respective reel, and the method further comprises the steps of:

initiating spinning of the plurality of reels;

causing each of the plurality of reels to stop spinning at the respective reel stop position identified in the set of characters set forth in the second one of the plurality of lookup tables which corresponds to the second match numbers matching the determined second random number; and providing the second bonus payout to the user.

14. The method as set forth in claim 11, wherein the method further comprises the steps of:

determining that the first random number does not match one of set of match numbers set forth in the initial look up table; and ending the bonus game.

15. A system for providing an electronic casino game to at least one player comprising:

a display device configured to display the casino game including a plurality of reels that are spinned and stopped during play of a base game of the casino game;

an accepting device configured to accept a physical item of monetary value, the monetary value establishing a credit balance, the credit balance being increasable and decreasible based at least on wagering activity;

at least one input device configured to receive an input to cause an initiation of a payout associated with the credit balance;

a computer coupled to the display device, the computer having memory for storing the casino game; and at least one controller coupled to the computer and the display device, wherein the computer is configured to:

facilitate play of the base game by spinning and stopping the reels on the display device in response to placing a wager, the wager decreasing the credit balance;

detect a trigger event during play of the base game;

upon detecting the trigger event during play of the base game, initiate a bonus game, the bonus game having at least two bonus rounds including a first bonus round and a second bonus round, wherein during each bonus round the plurality of reels are spinned and stopped;

determine a first random number generated by a random number generator;

determine an initial lookup table for the first bonus round, the initial lookup table selected from a plurality of lookup tables, wherein each of the plurality of lookup tables include a set of match numbers corresponding to generated random numbers, each match number having (i) a corresponding bonus payout and (ii) an identifier identifying a second one of the plurality of lookup tables to be utilized for the second bonus round, the second one of the plurality of lookup tables being different than the initial lookup table;

initiate the first bonus round and determine a first bonus payout of the first bonus round utilizing the initial lookup table and the first random number;

determine a second random number generated by the random number generator;

initiate the second bonus round and determine a second bonus payout for the second bonus round utilizing the second one of the plurality of lookup tables and the second random number; and detect the input to cause the initiation of the payout, via the at least one input device.

* * * * *